(12) United States Patent
Gador et al.

(10) Patent No.: US 9,129,323 B1
(45) Date of Patent: Sep. 8, 2015

(54) METHOD AND SYSTEM FOR FACILITATING CUSTOMER DRIVEN GROUP SALES AND DISCOUNTS

(71) Applicant: Intuit Inc., Mountain View, CA (US)

(72) Inventors: Brandon Gador, San Francisco, CA (US); Jeremy Vandehey, San Francisco, CA (US); Mack McConnell, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 439 days.

(21) Appl. No.: 13/622,059

(22) Filed: Sep. 18, 2012

(51) Int. Cl.
*G06Q 30/00* (2012.01)
*G06Q 30/06* (2012.01)
*G06Q 50/00* (2012.01)

(52) U.S. Cl.
CPC ............ *G06Q 30/0605* (2013.01); *G06Q 50/01* (2013.01)

(58) Field of Classification Search
CPC .......... G06Q 30/0601; G06Q 30/0222; G06Q 30/0207; G06Q 30/0605; G06Q 30/0641; G06Q 50/01
USPC ................................. 705/26.1, 27.1
See application file for complete search history.

(56) References Cited

U.S. PATENT DOCUMENTS

2013/0066700 A1* 3/2013 Portnoy et al. ............. 705/14.23

OTHER PUBLICATIONS

"Deal or No Deal" (Journal of Research in Interactive Marketing; Coulter, Keith; Roggeveen, Anne. vol. 6 issue 2 pp. 78-95. Sep. 20, 2012).*

* cited by examiner

*Primary Examiner* — Courtney Stopp
(74) *Attorney, Agent, or Firm* — Hawley Troxell Ennis & Hawley LLP; Philip McKay

(57) ABSTRACT

Item identification data indicating a product or service of interest to a first party is obtained and posted to one or more network locations accessible by one or more other parties associated with the first party. Activity on the one or more network locations where the item identification data is posted is then monitored. If data indicating interest in the product or service from one or more other parties is identified that exceeds a threshold level of indicated interest, then at least one provider of the product or service is notified and provided the opportunity to extend a potential group sale related offer to at least one of the individuals indicating interest in the product or service.

27 Claims, 5 Drawing Sheets

METHOD AND SYSTEM FOR FACILITATING CUSTOMER DRIVEN GROUP SALES AND DISCOUNTS

SUMMARY

In accordance with one embodiment, a system and method for facilitating customer driven group sales and discounts includes obtaining item identification data indicating a product or service of interest to a first party. In one embodiment, the item identification data is posted to one or more network locations accessible by one or more other parties associated with the first party.

In one embodiment at least one provider of the product or service indicted by the item identification data is informed of the posting of the item identification data. In one embodiment, activity on the one or more network locations where the item identification data is posted is monitored. In one embodiment, if data indicating interest in the product or service from one or more other parties is identified that exceeds a threshold level of indicated interest, then the at least one provider of the product or service is notified and provided the opportunity to extend a group sale related offer to at least one of the individuals indicating interest in the product or service.

Figure 1:
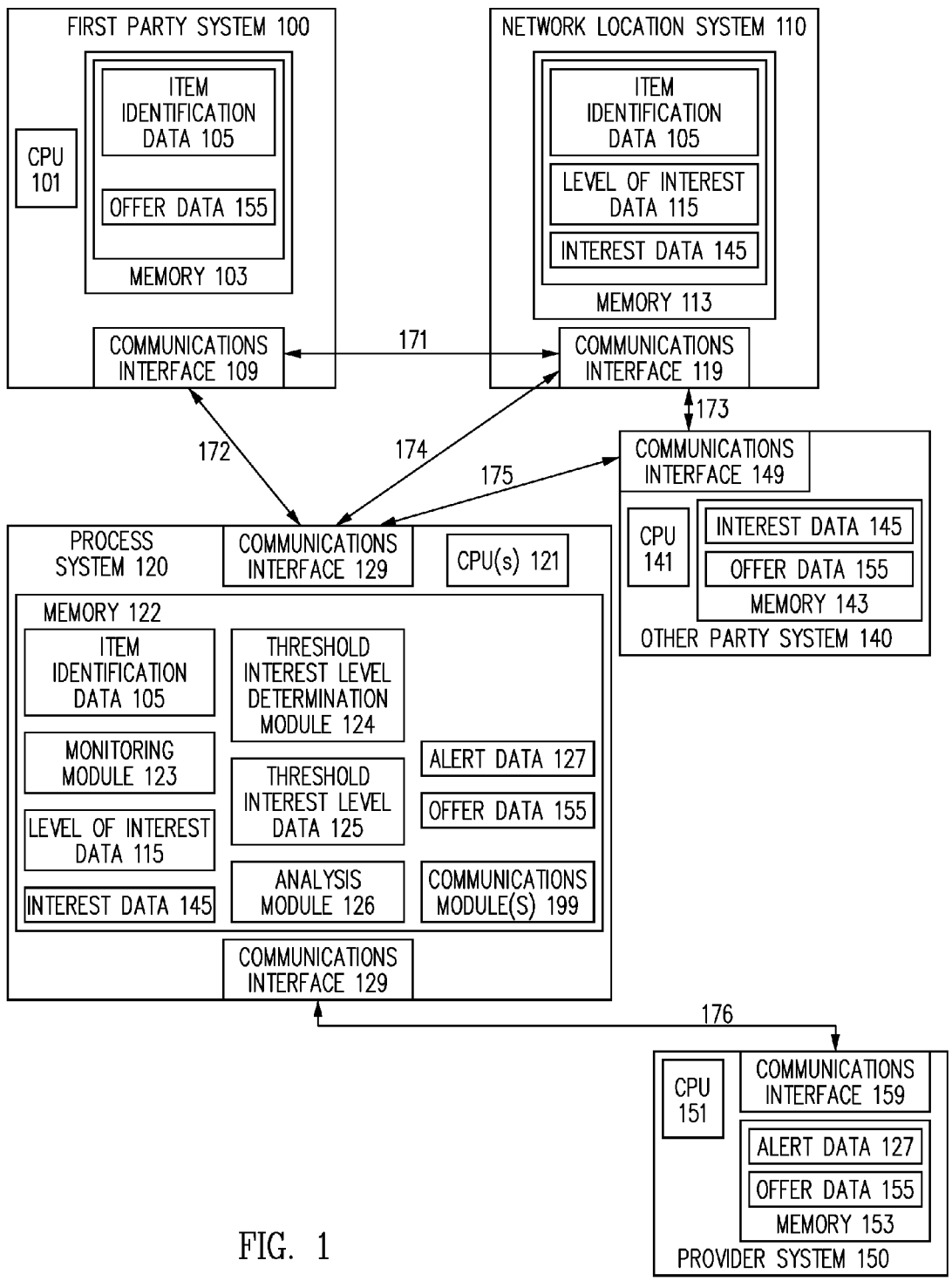
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for facilitating customer driven group sales and discounts includes a process for facilitating customer driven group sales and discounts implemented by one or more processors associated with one more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to: any general network, communications network, or general network/communications network system; a cellular network; a wireless network; a combination of different network types; a public network; a private network; a satellite network; a POTS network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a POTS network; any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In one embodiment, the process for facilitating customer driven group sales and discounts includes obtaining item identification data indicating a product or service of interest to a first party.

In various embodiments, the item identification data can be, but is not limited to, electronic image data associated with the product or service of interest to the first party, e.g., data including an image of the product or service; a URL or link to a webpage associated with the product or service of interest to the first party; a text description of the product or service of interest to the first party; and/or any other item identification data that indicates, and/or describes, and/or is associated with, a product or service of interest to the first party, as discussed herein, and/or as known/available in the art at the time of filing, and/or as developed/made available after the time of filing.

In various embodiments, the product or service of interest to the first party is any product and/or service available through one or more providers of products and/or services, i.e., merchants, such as but not limited to, traditional, e.g., brick and mortar, providers of products and/or services; Internet-based providers of products and/or services; mail-service based providers of products and/or services; auction-based providers of products and/or services; and/or any other providers of products and/or services as discussed herein, and/or as known/available in the art at the time of filing, and/or as developed/made available after the time of filing.

In various embodiments, the first party is any individual and/or entity such as, but not limited to, a single party potential customer; two or more potential customers; a retailer of products and/or services; a wholesale entity; and/or any other party or entity interested in a product or service as discussed herein, and/or as known/available in the art at the time of filing, and/or as developed/made available after the time of filing.

In one embodiment, the item identification data is posted to one or more network locations accessible by one or more other parties.

In various embodiments the item identification data is posted to any website and/or other network location. For instance, in one embodiment, the item identification data is posted to one or more social media related networks and/or websites associated with the first party. In one embodiment, the item identification data is posted to one or more blog sites associated with the first party. In various embodiments, the item identification data is posted to one or more e-mail-based networks associated with the first party. In other embodiments, the item identification data is posted to any network location or system accessible by one or more other parties as discussed herein, and/or as known/available in the art at the time of filing, and/or as developed/made available after the time of filing.

In various embodiments, the other parties are any individuals and/or entities, other than the first party, such as, but not limited to, single party potential customers; two or more potential customers; retailers of products and/or services; wholesale entities; and/or any other parties or entities, other than the first party, that may be interested in a product or service as discussed herein, and/or as known/available in the art at the time of filing, and/or as developed/made available after the time of filing.

In one embodiment at least one provider of the product or service is informed of the posting of the item identification data. In various embodiments, the at least one provider of the product or service is informed of the posting of the item identification data via one or more means for informing the at least one provider of the product or service of the posting such as, but not limited to, through the one or more network locations; e-mail; text message; POTS; or any other method, means, mechanism, process or procedure for informing the least one provider of the product or service of the posting discussed herein, and/or as known/available in the art at the time of filing, and/or as developed/made available after the time of filing.

In one embodiment, a threshold level of indicated interest is established such that if data is obtained from one or more of the other parties expressing qualifying interest in purchasing the product or service indicated in the posted item identification data, then at least one provider of the product or service is notified of a potential group sale of the product or service indicated in the posted item identification data.

In various embodiments, the threshold level of indicated interest includes, but is not limited to, any one or more of the following threshold level of indicated interest conditions: that a threshold level of activity and/or access events associated with the one or more network locations, and/or the posted item identification data, is observed; that a threshold level of responses to the posted item identification data indicating expressed interest in purchasing the product or service indicated in the posted item identification data is observed; that a threshold number of occurrences of keywords and/or phrases included in responses to the posted item identification data is detected; that other data indicating a statistically significant level of response traffic to the posted item identification data on the one or more network locations is detected; that time spent and click-throughs of the one or more network locations of a threshold value and/or occurrence number is observed; and/or any combination of the threshold level of indicated interest conditions above, and/or any other threshold level of indicated interest conditions as discussed herein, and/or as known/available in the art at the time of filing, and/or as developed/made available after the time of filing.

In one embodiment, activity on the one or more network locations where the item identification data is posted is monitored. In one embodiment, activity on the one or more network locations where the item identification data is posted is monitored by tracking the number of times the one or more network locations are accessed and/or the content of any postings to the one or more network locations by one or more other parties. In one embodiment, activity on the one or more network locations where the item identification data is posted is monitored by tracking the number of responses to the postings and/or the content of any responses.

In various other embodiments, activity on the one or more network locations where the item identification data is posted is monitored by tracking one or more of: any defined activity and/or access events associated with the one or more network locations and/or the posted item identification data; the level of responses to the posted item identification data indicating expressed interest in purchasing the product or service indicated in the posted item identification data in a defined timeframe; the number of occurrences of keywords and/or phrases included in responses to the posted item identification data; other data indicating a statistically significant level of response traffic to the posted item identification data on the one or more network locations; time spent and click-throughs of the one or more network locations; and/or any combination of the activities on the one or more network locations above, and/or any other activity on the one or more network locations where the item identification data is posted as discussed herein, and/or as known/available in the art at the time of filing, and/or as developed/made available after the time of filing.

In one embodiment, the data indicating activity on the one or more network locations and data indicating the threshold level of indicated interest are analyzed/compared by one or more processors associated with one or more computing systems.

In one embodiment, when a determination is made that an interest level in the product or service meets or exceeds the threshold level of indicated interest, at least one provider of the product or service is notified.

In various embodiments, the at least one provider of the product or service is notified that an interest level in the product or service meeting or exceeding the threshold level of indicated interest has been attained via one or more means for notification such as, but not limited to, providing notice through the one or more network locations; e-mail; text message; POTS; or any other method, means, mechanism, process or procedure for informing the least one provider of the product or service discussed herein, and/or as known/available in the art at the time of filing, and/or as developed/made available after the time of filing.

In one embodiment, the at least one provider of the product or service is then provided the opportunity to provide offer data extending a potential group sale related offer to at least one, or all, of the individuals indicating interest in the product or service.

In one embodiment, the offer data extending a potential group sale related offer includes a discount price for the product or service. In one embodiment, the offer data extending a potential group sale related offer includes any other marketing/sale incentive to be associated with the product or service as discussed herein, and/or as known/available in the art at the time of filing, and/or as developed/made available after the time of filing.

In one embodiment, the offer data extending a potential group sale related offer is unconditional and is made based on an estimated number of the individuals indicating interest in the product or service accepting the group sale related offer and actually purchasing the product or service.

In one embodiment, the offer data extending a potential group sale related offer is conditional based on a required number of the individuals indicating interest in the product or service accepting the group sale related offer and actually purchasing the product or service.

In one embodiment, the offer data extending a potential group sale related offer is tier-based, e.g., the group sale related offer terms are dependent on the number of the individuals indicating interest in the product or service accepting the group sale related offer and actually purchasing the product or service.

In one embodiment, the offer data extending a potential group sale related offer is then provided to at least one, or all, of the individuals indicating interest in the product or service.

In one embodiment, the offer data extending a potential group sale related offer is provided to at least one, or all, of the individuals indicating interest in the product or service via one or more means for transferring data such as, but not limited to, providing the data through the one or more network locations; e-mail; text message; POTS; or any other method, means, mechanism, process or procedure for transferring data discussed herein, and/or as known/available in the art at the time of filing, and/or as developed/made available after the time of filing.

Using the system and method for facilitating customer driven group sales and discounts discussed herein, an individual, e.g., a single potential purchaser of a product or service, is provided an effective, efficient, and simple mechanism for creating group interest in the purchase of the product or service, e.g., for identifying and collecting a group of potential customers of the product or service. Then, using the system and method for facilitating customer driven group sales and discounts discussed herein, the existence of the group of potential customers of a product or service can easily, efficiently, and effectively be leveraged to solicit/extract a group purchase discount offer from one or more providers of the product or service. Consequently, using the system and method for facilitating customer driven group sales and discounts discussed herein, individuals can obtain group pricing benefits currently only offered to wholesale and lot purchasers such as wholesale purchasers and retail stores.

In addition, through the system and method for facilitating customer driven group sales and discounts discussed herein, providers of products and services are provided the opportunity to increase their sales volume, and to essentially utilize individuals as marketing and advertising agents. Consequently, both individual consumers of products and services and providers of the products and services are benefited by the system and method for facilitating customer driven group sales and discounts discussed herein.

Hardware System Architecture

FIG. 1 is a block diagram of an exemplary hardware architecture for implementing one embodiment of a process for facilitating customer driven group sales and discounts, such as exemplary process 300 (FIG. 3) discussed herein.

FIG. 1 includes first party system 100, e.g., a computing system associated with a first party interested in purchasing a product or service; network location system 110, e.g., a computing system hosting a website, or other network location; process system 120, e.g., a computing system associated with a provider of a process for facilitating customer driven group sales and discounts; other party system 140, e.g., a representative computing system accessible by one or more parties, other than the first party, interested in purchasing the product or service; provider system 150, e.g., a computing system associated with a provider of the product or service, and communication channels 171, 172, 173, 174, 175, and 176.

As seen in FIG. 1, first party system 100 includes processor/Central Processing Unit (CPU) 101, memory 103, and communication interface 109. In various embodiments, first party system 100 can be any computing system discussed herein, and/or as known in the art at the time of filing, and/or as developed after the time of filing.

As seen in FIG. 1, memory 103 includes item identification data 105. As discussed below, item identification data 105 includes data indicating a product or service of interest to a first party associated with first party system 100.

In various embodiments, item identification data 105 can be, but is not limited to, electronic image data associated with the product or service of interest to the first party, e.g., data including an image of the product or service; a URL or link to a webpage associated with the product or service of interest to the first party; a text description of the product or service of interest to the first party; and/or any other item identification data that indicates, and/or describes, and/or is associated with, a product or service of interest to the first party, as discussed herein, and/or as known/available in the art at the time of filing, and/or as developed/made available after the time of filing.

As seen in FIG. 1, memory 103 includes offer data 155. As discussed below, offer data 155 includes data extending a group sale related offer associated with the product or service. As also discussed below, offer data 155 is received from a provider of the product or service indicated in item identification data 105 and, in one embodiment, is received by, or through, process system, 120 via communications interface 129, communications channel 172, and communications interface 109.

In various embodiments, first party system 100 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, first party system 100, whether available or known at the time of filing or as later developed.

While a single first party system, first party system 100, is shown in FIG. 1, those of skill in the art will readily recognize that first party system 100 is representative of any number of first party systems. Consequently, in various embodiments, there can be more than the single first party system 100 shown in FIG. 1.

As seen in FIG. 1, network location system 110 includes memory 113, and communication interface 119. In various embodiments, network location system 110 can be any computing system discussed herein, and/or as known in the art at the time of filing, and/or as developed after the time of filing.

In various embodiments, network location system 110 is any computing system hosting, coordinating, and/or associated with, any network location accessible by the first party and one or more other parties as discussed herein, and/or as known/available in the art at the time of filing, and/or as developed/made available after the time of filing.

In one embodiment, network location system 110 is any computing system hosting, coordinating, and/or associated with, one or more social media related networks and/or websites associated with the first party.

In one embodiment, network location system 110 is any computing system hosting, coordinating, and/or associated with, one or more blog sites associated with the first party.

In one embodiment, network location system 110 is any computing system hosting, coordinating, and/or associated with, one or more e-mail-based networks associated with the first party.

As seen in FIG. 1, memory 113 includes item identification data 105 that is posted to the network location hosted by, coordinated by, or associated with, network location system 110. In one embodiment, item identification data 105 is then accessible by one or more other parties through network location system 110 from other party systems, such as other party system 140.

As seen in FIG. 1, memory 113 includes level of interest data 115. As discussed below, level of interest data 115 includes data indicating activity on the one or more network locations hosted by, coordinated by, or associated with network location system 110 where item identification data 105 is posted. As seen in FIG. 1, level of interest data 115 includes interest data 145 indicating a party associated with other party system 140 has interest in purchasing the product or service indicated by item identification data 105.

In various embodiments, network location system 110 may further include one or CPUs (not shown) as well as standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, network location system 110, whether available or known at the time of filing or as later developed.

While a single network location system, network location system 110, is shown in FIG. 1, those of skill in the art will readily recognize that network location system 110 is representative of any number of network location systems. Consequently, in various embodiments, there can be more than the single network location system 110 shown in FIG. 1.

As seen in FIG. 1, other party system 140 includes processor/Central Processing Unit (CPU) 141, memory 143, and communication interface 149. In various embodiments, other party system 140 can be any computing system discussed herein, and/or as known in the art at the time of filing, and/or as developed after the time of filing.

As noted above, other party system 140 is used by a party other the first party to access item identification data 105 that is posted to the network location hosted by, coordinated by, or associated with, network location system 110.

As seen in FIG. 1, memory 143 includes interest data 145 and offer data 155. As discussed noted above, interest data 145 indicates that the other party associated with other party system 140 has interest in purchasing the product or service indicated by item identification data 105. In one embodiment, interest data 145 is posted to the network location hosted by, coordinated by, or associated with, network location system 110 and is included in level of interest data 115.

In various embodiments, other party system 140 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, other party system 140, whether available or known at the time of filing or as later developed.

While a single other party system, other party system 140, is shown in FIG. 1, those of skill in the art will readily recognize that other party system 140 is representative of any number of other party systems. Consequently, in various embodiments, there can be more than the single other party system 140 shown in FIG. 1.

As seen in FIG. 1, provider system 150 includes processor/Central Processing Unit (CPU) 151, memory 153, and communication interface 159. In various embodiments, provider system 150 can be any computing system discussed herein, and/or as known in the art at the time of filing, and/or as developed after the time of filing.

As seen in FIG. 1, memory 153 includes alert data 127 as received from process system 120, via communications interface 129, communications channel 176, and communications interface 159. As discussed below, alert data 127 includes data notifying the provider of the product or service indicated by item identification data 105 that an interest level in the product or service meeting or exceeding a threshold level of indicated interest has been attained.

As seen in FIG. 1, memory 153 includes offer data 155. In one embodiment, offer data 155 is generated and provided by the provider of the product or service indicated by item identification data 105 in response to alert data 127.

In various embodiments, provider system 150 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, provider system 150, whether available or known at the time of filing or as later developed.

While a single provider system, provider system 150, is shown in FIG. 1, those of skill in the art will readily recognize that provider system 150 is representative of any number of provider systems. Consequently, in various embodiments, there can be more than the single provider system 150 shown in FIG. 1.

As also seen in FIG. 1, process system 120 typically includes a processor/Central Processing Unit (CPU) 121, a memory 122, and a communications interface 129.

Process system 120 can be any computing system as discussed herein, and/or as known in the art at the time of filing, and/or as developed thereafter, that includes components that can execute all, or part, of a process for facilitating customer driven group sales and discounts in accordance with at least one of the embodiments as described herein.

In one embodiment, memory 122 includes all, or part, of item identification data 105, received from first party system 100 and/or network location system 110. In one embodiment, memory 122 also includes all, or part, of level of interest data 115 received from network location system 110 and/or one or more other party systems, such as other party system 140 providing interest data 145 included in level of interest data 115.

In one embodiment, memory 122 includes all, or part, of monitoring module 123 used to monitor activity on the one or more network locations hosted by, coordinated by, and/or associated with, network location systems 110, where item identification data 105 is posted. In one embodiment, monitoring module 123 obtains, and/or processes, level of interest data 115.

In one embodiment, memory 122 includes all, or part, of threshold interest level determination module 124. As discussed below, in one embodiment, threshold interest level determination module 124 generates threshold interest level data 125 indicating a threshold level of indicated interest. As discussed below, if, at analysis module 126, it is determined that level of interest data 115 indicates qualifying interest in purchasing the product or service indicated in the posted item identification data that exceeds threshold interest level data 125, then at least one provider of the product or service is notified of a potential group sale of the product or service indicated in the posted item identification data 105 via alert data 127.

In one embodiment, memory 122 includes all, or part, of offer data 155, as received from provider system 150 via communications interface 159, communications channel 176, and communications interface 129. In one embodiment, offer data 155 is then provided to first party system 100 and/or other party system 110 via communications interface 129, communications channels 172 and 175, and communications interfaces 109 and 119.

Process system 120 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, process system 120, whether available or known at the time of filing or as later developed.

In one embodiment, any, or all, of communications channels 171, 172, 173, 174, 175, and 176 can be, but are not limited to: any network; a mobile communication link, such as a mobile phone link; a land-line phone link; a cable-based communications channel; a satellite communications channel; the Internet, a cloud, or other network communications channel; and/or any other communications channel, or combination of communications channels, as discussed herein, and/or as known in the art at the time of filing, and/or as developed after the time of filing.

In one embodiment, first party system 100, and/or other party system 140, and/or process system 120, and/or provider system 150 are part of a cloud computing environment.

Those of skill in the art will readily recognize that the components shown in FIG. 1, and their respective sub-components, are shown for illustrative purposes only and that architectures with more or fewer components can implement, and benefit from, the invention. In addition, the particular type of, and configuration of, first party system 100, and/or other party system 140, and/or process system 120, and/or provider system 150 are not relevant.

In various embodiments, the elements shown in FIG. 1 are grouped into one or more processes, or sub-processes, used to implement all, or part of, a process for facilitating customer driven group sales and discounts, such as exemplary process 300 (FIG. 3) discussed herein.

Figure 2A:
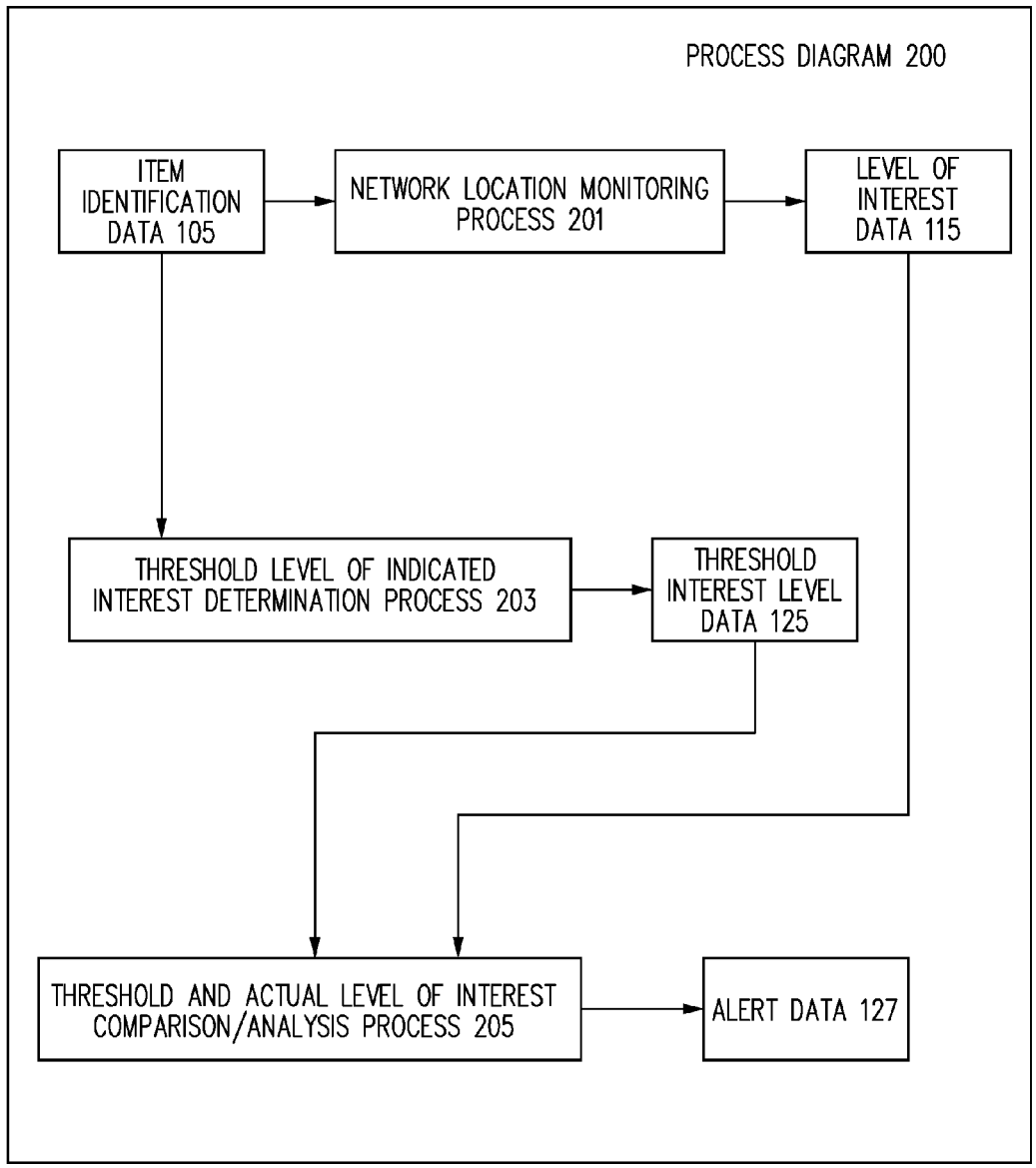
FIG. 2A is a process diagram of a process for facilitating customer driven group sales and discounts in accordance with one embodiment.

FIG. 2A is a process diagram showing one illustrative example of the interaction of various illustrative processes, or sub-processes, 201, 203, and 205, used to implement all, or part of, a process for facilitating customer driven group sales and discounts, such as exemplary process 300 (FIG. 3) discussed herein.

Figure 2B:
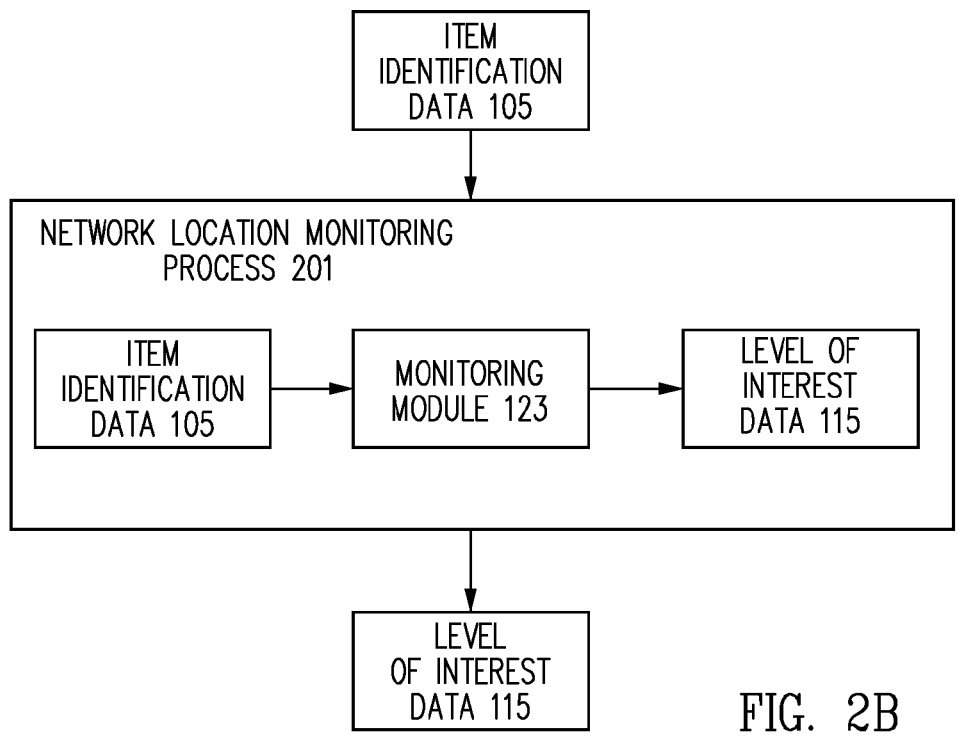
FIG. 2B shows a network location monitoring process in accordance with one embodiment.
Figure 2C:
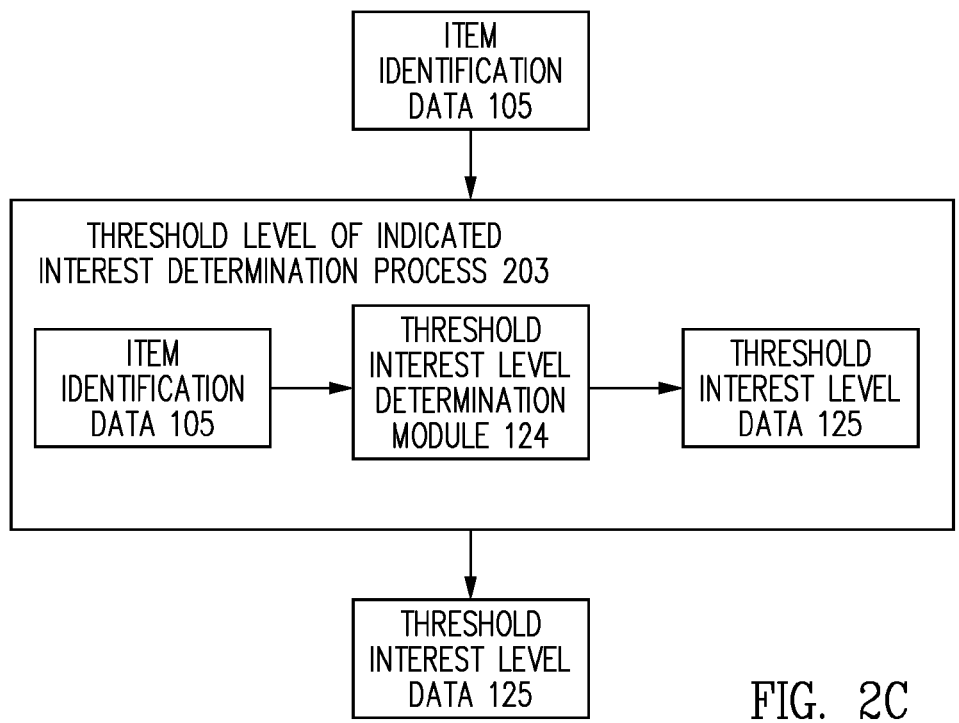
FIG. 2C shows a threshold level of indicated interest determination process in accordance with one embodiment.
Figure 2D:
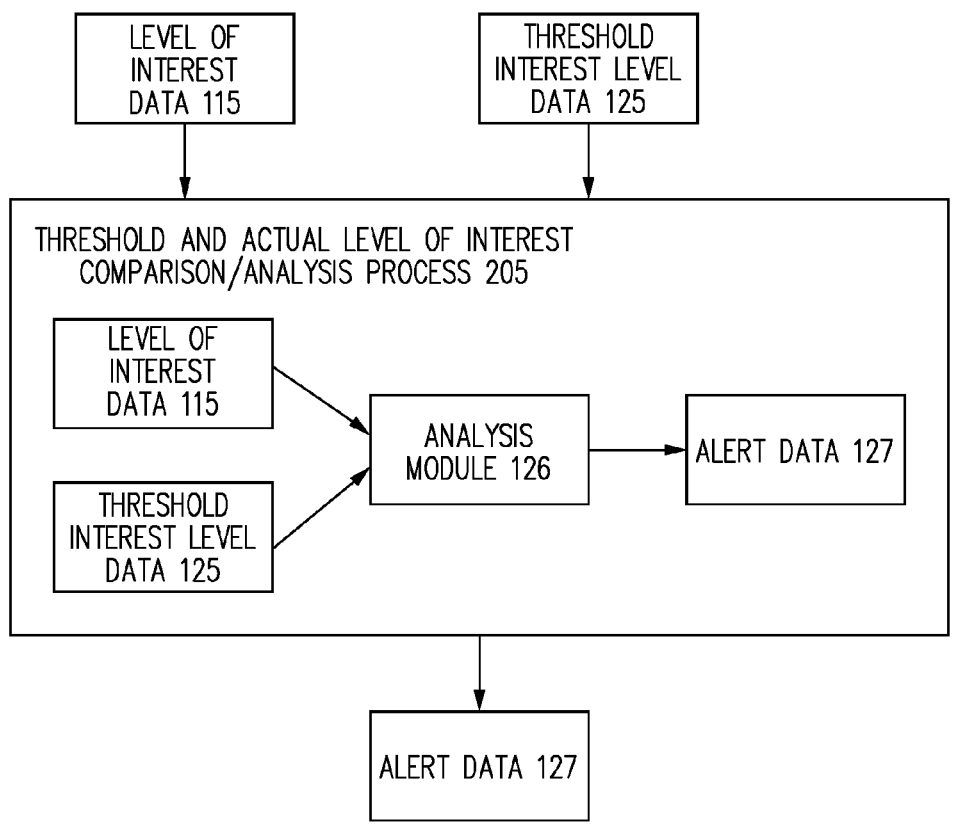
FIG. 2D shows a threshold and actual level of interest comparison/analysis process in accordance with one embodiment.

FIGS. 2B, 2C, and 2D show illustrative examples of processes 201, 203, and 205 in accordance with one embodiment.

Referring to FIG. 1, FIG. 2A, FIG. 2B, FIG. 2C, and FIG. 2D together, item identification data 105 is provided to network location monitoring process 201 where item identification data 105 is used to monitor activity on the one or more network locations where item identification data 105 is posted and generate/collect level of interest data 115. FIG. 2B shows network location monitoring process 201 in more detail.

As seen in FIG. 2B, item identification data 105 is used as input data to monitoring module 123 that processes item identification data 105 to identify the network location to be monitored. Then monitoring module 123 is used to monitor activity on the one or more network locations where the item identification data 105 is posted and generate/collect level of interest data 115.

In various embodiments, monitoring module 123 monitors activity on the one or more network locations where the item identification data was posted and generate/collect level of interest data 115 by tracking one or more of: the number of times the one or more network locations are accessed and/or the content of any postings to the one or more network locations by one or more other parties; the number of responses made through the more network locations to the posting and/or the content of any responses; the activity and/or access events associated with the one or more network locations and/or the posted item identification data in a defined time interval; the level of responses to the posted item identification data indicating expressed interest in purchasing the product or service indicated in the posted item identification data in a defined time interval; the number of occurrences of keywords and/or phrases included in responses to the posted item identification data; other data indicating a statistically significant level of response traffic to the posted item identification data on the one or more network locations; time spent and click-throughs of the one or more network locations; and/or any combination of the activities on the one or more network locations above, and/or any other activity on the one or more network locations where the item identification data is posted as discussed herein, and/or as known/available in the art at the time of filing, and/or as developed/made available after the time of filing.

Referring back to FIG. 1, FIG. 2A, FIG. 2B, FIG. 2C, and FIG. 2D together, in one embodiment, item identification data 105 is also provided to threshold level of indicated interest determination process 203 which transforms at least part of item identification data 105 into threshold interest level data 125. FIG. 2C shows threshold level of indicated interest determination process 203 in more detail.

As seen in FIG. 2C, item identification data 105 is used as input data to threshold interest level determination module 124 which determines one or more threshold level of indicated interest conditions to be included in threshold interest level data 125 based, in part on the content/subject matter of item identification data 105 and the network location being monitored.

In various embodiments, the threshold level of indicated interest conditions include, but are not limited to, any one or more of the following: that a threshold level of activity and/or access events associated with the one or more network locations, and/or the posted item identification data, is observed; that a threshold level of responses to the posted item identification data indicating expressed interest in purchasing the product or service indicated in the posted item identification data is observed; that a threshold number of occurrences of keywords and/or phrases included in responses to the posted item identification data is detected; that other data indicating a statistically significant level of response traffic to the posted item identification data on the one or more network locations is detected; that time spent and click-throughs of the one or more network locations of a threshold value and/or occurrence number is observed; and/or any combination of the threshold level of indicated interest conditions above, and/or any other threshold level of indicated interest conditions as discussed herein, and/or as known/available in the art at the time of filing, and/or as developed/made available after the time of filing.

Referring back to FIG. 1, FIG. 2A, FIG. 2B, FIG. 2C, and FIG. 2D together, in one embodiment, level of interest data 115 and threshold interest level data 125 is provided to threshold and actual level of interest comparison/analysis process 205 which processes level of interest data 115 and threshold interest level data 125 and, if appropriate, generates alert data 127. FIG. 2D shows threshold and actual level of interest comparison/analysis process 205 in more detail.

As seen in FIG. 2D, level of interest data 115 and threshold interest level data 125 are used as input data to analysis module 126 where a determination is made as to whether alert data 127 is to be generated.

In one embodiment, if a determination is made at analysis module 126 that interest data 115 indicates an interest level in the product or service that meets or exceeds the threshold level of indicated interest of threshold interest level data 125, then at least one provider of the product or service is notified that an interest level in the product or service meeting or exceeding the threshold level of indicated interest of threshold interest level data 125 has been attained via alert data 127. In one embodiment, alert data 127 is provided to at least one provider of the product or service using one or more means/communication channels for notification such as, but not limited to, providing notice through the one or more network locations; e-mail; text message; POTS; or any other method, means, mechanism, process or procedure providing the least one provider of the product or service with alert data 127 discussed herein, and/or as known/available in the art at the time of filing, and/or as developed/made available after the time of filing.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a system and method for facilitating customer driven group sales and discounts includes obtaining item identification data, such as but not limited to, image data, or website access data, or text data, indicating a product or service of interest to a first party.

In one embodiment, the item identification data is posted to one or more network locations accessible by one or more parties other than the first party, such as, but not limited to, a social media/network website associated with the first party.

In one embodiment at least one provider of the product or service is informed of the posting of the item identification data. In one embodiment, activity on the one or more network locations where the item identification data is posted is monitored. In one embodiment, if data indicating interest in the product or service from one or more other parties is identified that exceeds a threshold level of indicated interest, then the at least one provider of the product or service is notified and provided the opportunity to extend a potential group sale related offer such as, but not limited to, a discount price for the product or service, to at least one, or all, of the individuals indicating interest in the product or service.

In accordance with one embodiment, a system and method for facilitating customer driven group sales and discounts includes a process for facilitating customer driven group sales and discounts implemented by one or more processors associated with one more computing systems.

Figure 3:
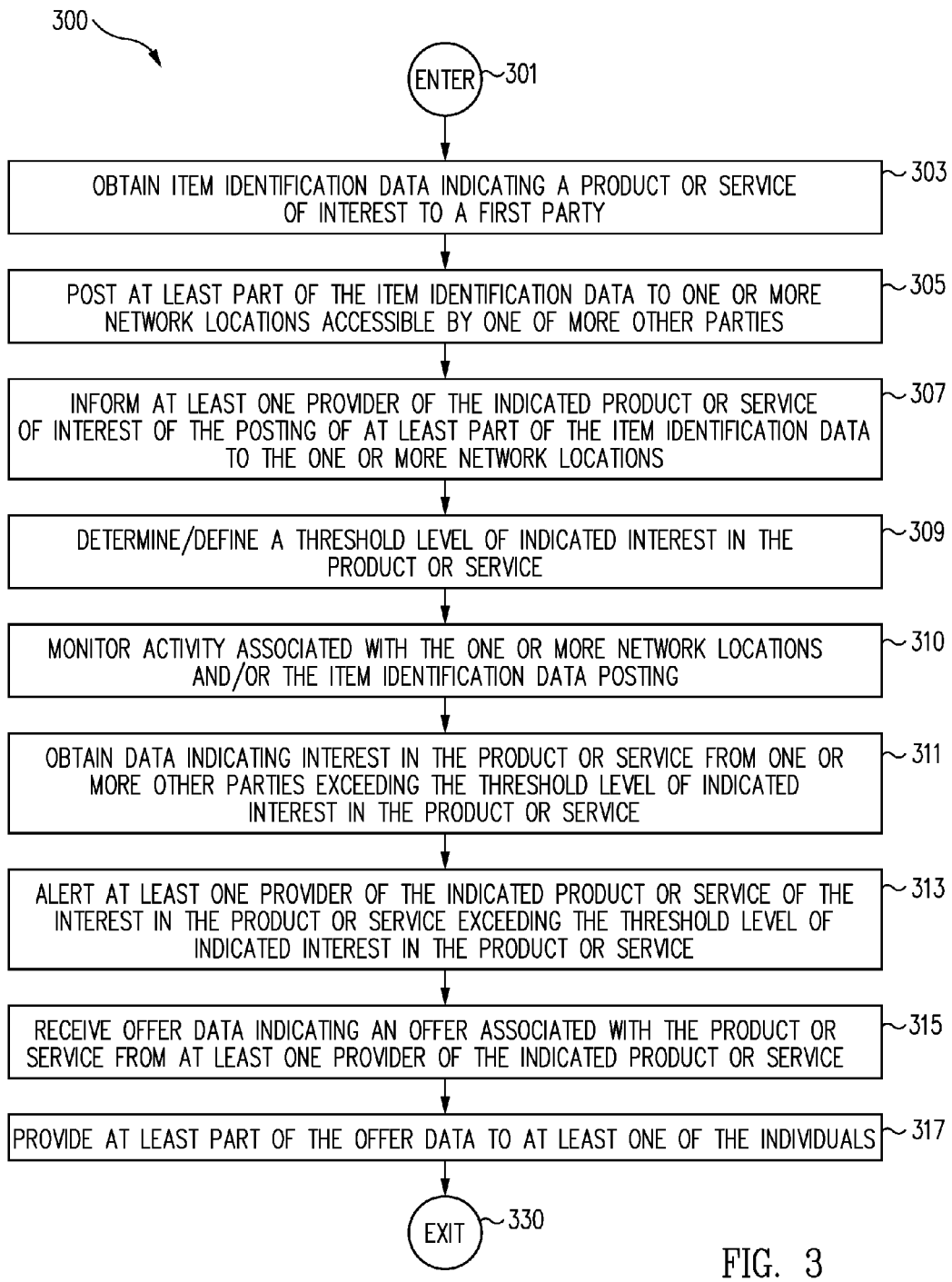
FIG. 3 is a flow chart depicting a process for facilitating customer driven group sales and discounts in accordance with one embodiment.

FIG. 3 is a flow chart depicting a process 300 for facilitating customer driven group sales and discounts in accordance with one embodiment. Process 300 for facilitating customer driven group sales and discounts begins at ENTER OPERATION 301 of FIG. 3 and process flow proceeds to OBTAIN ITEM IDENTIFICATION DATA INDICATING A PRODUCT OR SERVICE OF INTEREST TO A FIRST PARTY OPERATION 303.

In one embodiment, at OBTAIN ITEM IDENTIFICATION DATA INDICATING A PRODUCT OR SERVICE OF INTEREST TO A FIRST PARTY OPERATION 303 item identification data indicating a product or service of interest to a first party is obtained from the first party.

In one embodiment, item identification data indicating a product or service of interest to a first party is obtained at OBTAIN ITEM IDENTIFICATION DATA INDICATING A PRODUCT OR SERVICE OF INTEREST TO A FIRST PARTY OPERATION 303 from the first party via a mobile computing system associated with the first party.

In one embodiment, item identification data indicating a product or service of interest to a first party is obtained at OBTAIN ITEM IDENTIFICATION DATA INDICATING A PRODUCT OR SERVICE OF INTEREST TO A FIRST PARTY OPERATION 303 from the first party via any computing system associated with the first party as discussed herein, and/or as known/available in the art at the time of filing, and/or as developed/made available after the time of filing.

In various embodiments, the item identification data of OBTAIN ITEM IDENTIFICATION DATA INDICATING A PRODUCT OR SERVICE OF INTEREST TO A FIRST PARTY OPERATION 303 can be, but is not limited to, electronic image data associated with the product or service of interest to the first party, e.g., data including an image of the product or service; a URL or link to a webpage associated with the product or service of interest to the first party; a text description of the product or service of interest to the first party; and/or any other item identification data that indicates, and/or describes, and/or is associated with, a product or service of interest to the first party, as discussed herein, and/or as known/available in the art at the time of filing, and/or as developed/made available after the time of filing.

In various embodiments, the product or service of interest to the first party indicated by the item identification data obtained at OBTAIN ITEM IDENTIFICATION DATA INDICATING A PRODUCT OR SERVICE OF INTEREST TO A FIRST PARTY OPERATION 303 is any product and/or service available through one or more providers of products and/or services, i.e., merchants, such as but not limited to, traditional, e.g., brick and mortar, providers of products and/or services; Internet-based providers of products and/or services; mail-service based providers of products and/or services; auction-based providers of products and/or services; and/or any other providers of products and/or services as discussed herein, and/or as known/available in the art at the time of filing, and/or as developed/made available after the time of filing.

In various embodiments, the first party of OBTAIN ITEM IDENTIFICATION DATA INDICATING A PRODUCT OR SERVICE OF INTEREST TO A FIRST PARTY OPERATION 303 is any individual and/or entity such as, but not limited to, a single party potential customer; two or more potential customers; a retailer of products and/or services; a wholesale entity; and/or any other party or entity interested in a product or service as discussed herein, and/or as known/available in the art at the time of filing, and/or as developed/made available after the time of filing.

In one embodiment, once item identification data indicating a product or service of interest to a first party is obtained at OBTAIN ITEM IDENTIFICATION DATA INDICATING A PRODUCT OR SERVICE OF INTEREST TO A FIRST PARTY OPERATION 303, process flow proceeds to POST AT LEAST PART OF THE ITEM IDENTIFICATION DATA TO ONE OR MORE NETWORK LOCATIONS ACCESSIBLE BY ONE OF MORE OTHER PARTIES OPERATION 305.

In one embodiment, at POST AT LEAST PART OF THE ITEM IDENTIFICATION DATA TO ONE OR MORE NETWORK LOCATIONS ACCESSIBLE BY ONE OF MORE OTHER PARTIES OPERATION 305, at least part of the item identification data of OBTAIN ITEM IDENTIFICATION DATA INDICATING A PRODUCT OR SERVICE OF INTEREST TO A FIRST PARTY OPERATION 303 is posted to one or more network locations accessible by one or more other parties.

In various embodiments, at POST AT LEAST PART OF THE ITEM IDENTIFICATION DATA TO ONE OR MORE NETWORK LOCATIONS ACCESSIBLE BY ONE OF MORE OTHER PARTIES OPERATION 305, at least part of the item identification data of OBTAIN ITEM IDENTIFICATION DATA INDICATING A PRODUCT OR SERVICE OF INTEREST TO A FIRST PARTY OPERATION 303 is posted to any website and/or other network location.

For instance, in one embodiment, at POST AT LEAST PART OF THE ITEM IDENTIFICATION DATA TO ONE OR MORE NETWORK LOCATIONS ACCESSIBLE BY ONE OF MORE OTHER PARTIES OPERATION 305, at least part of the item identification data of OBTAIN ITEM IDENTIFICATION DATA INDICATING A PRODUCT OR SERVICE OF INTEREST TO A FIRST PARTY OPERATION 303 is posted to one or more social media related networks and/or websites associated with the first party.

In one embodiment, at POST AT LEAST PART OF THE ITEM IDENTIFICATION DATA TO ONE OR MORE NETWORK LOCATIONS ACCESSIBLE BY ONE OF MORE OTHER PARTIES OPERATION 305, at least part of the item identification data of OBTAIN ITEM IDENTIFICATION DATA INDICATING A PRODUCT OR SERVICE OF INTEREST TO A FIRST PARTY OPERATION 303 is posted to one or more blog sites associated with the first party.

In one embodiment, at POST AT LEAST PART OF THE ITEM IDENTIFICATION DATA TO ONE OR MORE NETWORK LOCATIONS ACCESSIBLE BY ONE OF MORE OTHER PARTIES OPERATION 305, at least part of the item identification data of OBTAIN ITEM IDENTIFICATION DATA INDICATING A PRODUCT OR SERVICE OF INTEREST TO A FIRST PARTY OPERATION 303 is posted to one or more e-mail-based networks associated with the first party.

In other embodiments, at POST AT LEAST PART OF THE ITEM IDENTIFICATION DATA TO ONE OR MORE NETWORK LOCATIONS ACCESSIBLE BY ONE OF MORE OTHER PARTIES OPERATION 305, at least part of the item identification data of OBTAIN ITEM IDENTIFICATION DATA INDICATING A PRODUCT OR SERVICE OF INTEREST TO A FIRST PARTY OPERATION 303 is posted to any network location accessible by one or more other parties as discussed herein, and/or as known/available in the art at the time of filing, and/or as developed/made available after the time of filing.

In various embodiments, the other parties of POST AT LEAST PART OF THE ITEM IDENTIFICATION DATA TO ONE OR MORE NETWORK LOCATIONS ACCESSIBLE BY ONE OF MORE OTHER PARTIES OPERATION 305 are any individuals and/or entities, other than the first party, such as, but not limited to, single party potential customers; two or more potential customers; retailers of products and/or services; wholesale entities; and/or any other parties or entities, other than the first party, and/or associated with the first party, that may be interested in a product or service as discussed herein, and/or as known/available in the art at the time of filing, and/or as developed/made available after the time of filing.

In one embodiment, once at least part of the item identification data of OBTAIN ITEM IDENTIFICATION DATA INDICATING A PRODUCT OR SERVICE OF INTEREST TO A FIRST PARTY OPERATION 303 is posted to one or more network locations accessible by one or more other parties at POST AT LEAST PART OF THE ITEM IDENTIFICATION DATA TO ONE OR MORE NETWORK LOCATIONS ACCESSIBLE BY ONE OF MORE OTHER PARTIES OPERATION 305, process flow proceeds to INFORM AT LEAST ONE PROVIDER OF THE INDICATED PRODUCT OR SERVICE OF INTEREST OF THE POSTING OF AT LEAST PART OF THE ITEM IDENTIFICATION DATA TO THE ONE OR MORE NETWORK LOCATIONS OPERATION 307.

In one embodiment, at INFORM AT LEAST ONE PROVIDER OF THE INDICATED PRODUCT OR SERVICE OF INTEREST OF THE POSTING OF AT LEAST PART OF THE ITEM IDENTIFICATION DATA TO THE ONE OR MORE NETWORK LOCATIONS OPERATION 307, at least one provider of the product or service is informed of the posting of the item identification data at POST AT LEAST PART OF THE ITEM IDENTIFICATION DATA TO ONE OR MORE NETWORK LOCATIONS ACCESSIBLE BY ONE OF MORE OTHER PARTIES OPERATION 305.

In one embodiment, at INFORM AT LEAST ONE PROVIDER OF THE INDICATED PRODUCT OR SERVICE OF INTEREST OF THE POSTING OF AT LEAST PART OF THE ITEM IDENTIFICATION DATA TO THE ONE OR MORE NETWORK LOCATIONS OPERATION 307, a single provider of the product or service is informed of the posting of the item identification data of POST AT LEAST PART OF THE ITEM IDENTIFICATION DATA TO ONE

OR MORE NETWORK LOCATIONS ACCESSIBLE BY ONE OF MORE OTHER PARTIES OPERATION 305.

In one embodiment, at INFORM AT LEAST ONE PROVIDER OF THE INDICATED PRODUCT OR SERVICE OF INTEREST OF THE POSTING OF AT LEAST PART OF THE ITEM IDENTIFICATION DATA TO THE ONE OR MORE NETWORK LOCATIONS OPERATION 307, two or more providers of the product or service are informed of the posting of the item identification data of POST AT LEAST PART OF THE ITEM IDENTIFICATION DATA TO ONE OR MORE NETWORK LOCATIONS ACCESSIBLE BY ONE OF MORE OTHER PARTIES OPERATION 305.

In various embodiments, at INFORM AT LEAST ONE PROVIDER OF THE INDICATED PRODUCT OR SERVICE OF INTEREST OF THE POSTING OF AT LEAST PART OF THE ITEM IDENTIFICATION DATA TO THE ONE OR MORE NETWORK LOCATIONS OPERATION 307 the at least one provider of the product or service is informed of the posting of the item identification data through one or more means/communication channels for informing the at least one provider of the product or service of the posting such as, but not limited to, through the one or more network locations; e-mail; text message; POTS; or any other method, means, mechanism, process or procedure for informing the least one provider of the product or service of the posting discussed herein, and/or as known/available in the art at the time of filing, and/or as developed/made available after the time of filing.

In one embodiment, once at least one provider of the product or service is informed of the posting of the item identification data of POST AT LEAST PART OF THE ITEM IDENTIFICATION DATA TO ONE OR MORE NETWORK LOCATIONS ACCESSIBLE BY ONE OF MORE OTHER PARTIES OPERATION 305 at INFORM AT LEAST ONE PROVIDER OF THE INDICATED PRODUCT OR SERVICE OF INTEREST OF THE POSTING OF AT LEAST PART OF THE ITEM IDENTIFICATION DATA TO THE ONE OR MORE NETWORK LOCATIONS OPERATION 307, process flow proceeds to DETERMINE/DEFINE A THRESHOLD LEVEL OF INDICATED INTEREST IN THE PRODUCT OR SERVICE OPERATION 309.

In one embodiment, at DETERMINE/DEFINE A THRESHOLD LEVEL OF INDICATED INTEREST IN THE PRODUCT OR SERVICE OPERATION 309, a threshold level of indicated interest is established.

In one embodiment, at DETERMINE/DEFINE A THRESHOLD LEVEL OF INDICATED INTEREST IN THE PRODUCT OR SERVICE OPERATION 309, a threshold level of indicated interest is established such that if data is obtained from one or more of the other parties expressing qualifying interest in purchasing the product or service indicated in the posted item identification data of POST AT LEAST PART OF THE ITEM IDENTIFICATION DATA TO ONE OR MORE NETWORK LOCATIONS ACCESSIBLE BY ONE OF MORE OTHER PARTIES OPERATION 305, then at least one provider of the product or service is notified of a potential group sale of the product or service indicated in the posted item identification data.

In various embodiments, the threshold level of indicated interest of DETERMINE/DEFINE A THRESHOLD LEVEL OF INDICATED INTEREST IN THE PRODUCT OR SERVICE OPERATION 309 includes, but is not limited to, any one or more of the following threshold level of indicated interest conditions: that a threshold level of activity and/or access events associated with the one or more network locations, and/or the posted item identification data, is observed; that a threshold level of responses to the posted item identification data indicating expressed interest in purchasing the product or service indicated in the posted item identification data is observed; that a threshold number of occurrences of keywords and/or phrases included in responses to the posted item identification data is detected; that other data indicating a statistically significant level of response traffic to the posted item identification data on the one or more network locations is detected; that time spent and click-throughs of the one or more network locations of a threshold value and/or occurrence number is observed; and/or any combination of the threshold level of indicated interest conditions above, and/or any other threshold level of indicated interest conditions as discussed herein, and/or as known/available in the art at the time of filing, and/or as developed/made available after the time of filing.

In one embodiment, at DETERMINE/DEFINE A THRESHOLD LEVEL OF INDICATED INTEREST IN THE PRODUCT OR SERVICE OPERATION 309 data indicating the threshold level of indicated interest is stored in, or on, one or more memories, computing systems, networks, and/or databases using any method, means, process, or procedure, as discussed herein, and/or as known in the art at the time of filing, and/or as developed/made available after the time of filing.

In one embodiment, once a threshold level of indicated interest is established at DETERMINE/DEFINE A THRESHOLD LEVEL OF INDICATED INTEREST IN THE PRODUCT OR SERVICE OPERATION 309, process flow proceeds to MONITOR ACTIVITY ASSOCIATED WITH THE ONE OR MORE NETWORK LOCATIONS AND/OR THE ITEM IDENTIFICATION DATA POSTING OPERATION 310.

In one embodiment, at MONITOR ACTIVITY ASSOCIATED WITH THE ONE OR MORE NETWORK LOCATIONS AND/OR THE ITEM IDENTIFICATION DATA POSTING OPERATION 310 activity on the one or more network locations where the item identification data was posted at POST AT LEAST PART OF THE ITEM IDENTIFICATION DATA TO ONE OR MORE NETWORK LOCATIONS ACCESSIBLE BY ONE OF MORE OTHER PARTIES OPERATION 305 is monitored.

In one embodiment, at MONITOR ACTIVITY ASSOCIATED WITH THE ONE OR MORE NETWORK LOCATIONS AND/OR THE ITEM IDENTIFICATION DATA POSTING OPERATION 310 activity on the one or more network locations where the item identification data was posted is monitored by tracking the number of times the one or more network locations are accessed and/or the content of any postings to the one or more network locations by one or more other parties.

In one embodiment, at MONITOR ACTIVITY ASSOCIATED WITH THE ONE OR MORE NETWORK LOCATIONS AND/OR THE ITEM IDENTIFICATION DATA POSTING OPERATION 310 activity on the one or more network locations where the item identification data was posted is monitored by tracking the number of responses made through the more network locations to the posting and/or the content of any responses.

In various other embodiments, at MONITOR ACTIVITY ASSOCIATED WITH THE ONE OR MORE NETWORK LOCATIONS AND/OR THE ITEM IDENTIFICATION DATA POSTING OPERATION 310 activity on the one or more network locations where the item identification data is posted is monitored by tracking one or more of: the activity and/or access events associated with the one or more network locations and/or the posted item identification data in a defined time interval; the level of responses to the posted item identification data indicating expressed interest in purchasing the product or service indicated in the posted item identification data in a defined time interval; the number of occurrences of keywords and/or phrases included in responses to the posted item identification data; other data indicating a statistically significant level of response traffic to the posted item identification data on the one or more network locations; time spent and click-throughs of the one or more network locations; and/or any combination of the activities on the one or more network locations above, and/or any other activity on the one or more network locations where the item identification data is posted as discussed herein, and/or as known/available in the art at the time of filing, and/or as developed/made available after the time of filing.

In one embodiment, once activity on the one or more network locations where the item identification data was posted at POST AT LEAST PART OF THE ITEM IDENTIFICATION DATA TO ONE OR MORE NETWORK LOCATIONS ACCESSIBLE BY ONE OF MORE OTHER PARTIES OPERATION 305 is being monitored at MONITOR ACTIVITY ASSOCIATED WITH THE ONE OR MORE NETWORK LOCATIONS AND/OR THE ITEM IDENTIFICATION DATA POSTING OPERATION 310, process flow proceeds to OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311.

In one embodiment, at OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311, a determination is made that an interest level in the product or service observed at MONITOR ACTIVITY ASSOCIATED WITH THE ONE OR MORE NETWORK LOCATIONS AND/OR THE ITEM IDENTIFICATION DATA POSTING OPERATION 310 meets or exceeds the threshold level of indicated interest of DETERMINE/DEFINE A THRESHOLD LEVEL OF INDICATED INTEREST IN THE PRODUCT OR SERVICE OPERATION 309.

In one embodiment, at OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311 data indicating activity on the one or more network locations where the item identification data is posted obtained through the monitoring of the one or more network locations where the item identification data was posted at MONITOR ACTIVITY ASSOCIATED WITH THE ONE OR MORE NETWORK LOCATIONS AND/OR THE ITEM IDENTIFICATION DATA POSTING OPERATION 310 and data indicating the threshold level of indicated interest of DETERMINE/DEFINE A THRESHOLD LEVEL OF INDICATED INTEREST IN THE PRODUCT OR SERVICE OPERATION 309 are analyzed/compared under the direction of one or more processors, such as CPU 121 of FIG. 1, associated with one or more computing systems, such as process system 120 of FIG. 1.

Returning to FIG. 3, in one embodiment, at OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311 a determination is made that an interest level in the product or service meeting or exceeding the threshold level of indicated interest is present.

In one embodiment, once a determination is made that an interest level in the product or service observed at MONITOR ACTIVITY ASSOCIATED WITH THE ONE OR MORE NETWORK LOCATIONS AND/OR THE ITEM IDENTIFICATION DATA POSTING OPERATION 310 meets or exceeds the threshold level of indicated interest of DETERMINE/DEFINE A THRESHOLD LEVEL OF INDICATED INTEREST IN THE PRODUCT OR SERVICE OPERATION 309 at OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311, process flow proceeds to ALERT AT LEAST ONE PROVIDER OF THE INDICATED PRODUCT OR SERVICE OF THE INTEREST IN THE PRODUCT OR SERVICE EXCEEDING THE THRESHOLD LEVEL OF INDICATED INTEREST OPERATION 313.

In one embodiment, at ALERT AT LEAST ONE PROVIDER OF THE INDICATED PRODUCT OR SERVICE OF THE INTEREST IN THE PRODUCT OR SERVICE EXCEEDING THE THRESHOLD LEVEL OF INDICATED INTEREST OPERATION 313 the at least one provider of the product or service of INFORM AT LEAST ONE PROVIDER OF THE INDICATED PRODUCT OR SERVICE OF INTEREST OF THE POSTING OF AT LEAST PART OF THE ITEM IDENTIFICATION DATA TO THE ONE OR MORE NETWORK LOCATIONS OPERATION 307 is notified that an interest level in the product or service meeting or exceeding the threshold level of indicated interest has been attained at OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311.

In one embodiment, at ALERT AT LEAST ONE PROVIDER OF THE INDICATED PRODUCT OR SERVICE OF THE INTEREST IN THE PRODUCT OR SERVICE EXCEEDING THE THRESHOLD LEVEL OF INDICATED INTEREST OPERATION 313 the at least one provider of the product or service is notified that an interest level in the product or service meeting or exceeding the threshold level of indicated interest has been attained via one or more means/communication channels for notification such as, but not limited to, providing notice through the one or more network locations; e-mail; text message; POTS; or any other method, means, mechanism, process or procedure for informing the least one provider of the product or service discussed herein, and/or as known/available in the art at the time of filing, and/or as developed/made available after the time of filing.

In one embodiment, once the at least one provider of the product or service of INFORM AT LEAST ONE PROVIDER OF THE INDICATED PRODUCT OR SERVICE OF INTEREST OF THE POSTING OF AT LEAST PART OF THE ITEM IDENTIFICATION DATA TO THE ONE OR MORE NETWORK LOCATIONS OPERATION 307 is notified that an interest level in the product or service meeting or exceeding the threshold level of indicated interest has been attained at ALERT AT LEAST ONE PROVIDER OF THE INDICATED PRODUCT OR SERVICE OF THE INTEREST IN THE PRODUCT OR SERVICE EXCEEDING THE THRESHOLD LEVEL OF INDICATED INTEREST OPERATION 313, process flow proceeds to RECEIVE OFFER DATA INDICATING AN OFFER ASSOCIATED WITH THE PRODUCT OR SERVICE FROM AT LEAST ONE PROVIDER OF THE INDICATED PRODUCT OR SERVICE OPERATION 315.

In one embodiment, at RECEIVE OFFER DATA INDICATING AN OFFER ASSOCIATED WITH THE PRODUCT OR SERVICE FROM AT LEAST ONE PROVIDER OF THE INDICATED PRODUCT OR SERVICE OPERATION 315 the at least one provider of the product or service of ALERT AT LEAST ONE PROVIDER OF THE INDICATED PRODUCT OR SERVICE OF THE INTEREST IN THE PRODUCT OR SERVICE EXCEEDING THE THRESHOLD LEVEL OF INDICATED INTEREST OPERATION 313 is provided the opportunity to provide offer data extending a group sale related offer associated with the product or service to at least one, or all, of the individuals indicating interest in the product or service of OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311.

In one embodiment, the offer data extending a potential group sale related offer of RECEIVE OFFER DATA INDICATING AN OFFER ASSOCIATED WITH THE PRODUCT OR SERVICE FROM AT LEAST ONE PROVIDER OF THE INDICATED PRODUCT OR SERVICE OPERATION 315 includes an offer of group discount price for the product or service.

In one embodiment, the offer data extending a potential group sale related offer of RECEIVE OFFER DATA INDICATING AN OFFER ASSOCIATED WITH THE PRODUCT OR SERVICE FROM AT LEAST ONE PROVIDER OF THE INDICATED PRODUCT OR SERVICE OPERATION 315 includes any marketing/sale incentive to be associated with the product or service as discussed herein, and/or as known/available in the art at the time of filing, and/or as developed/made available after the time of filing.

In one embodiment, the offer data extending a potential group sale related offer of RECEIVE OFFER DATA INDICATING AN OFFER ASSOCIATED WITH THE PRODUCT OR SERVICE FROM AT LEAST ONE PROVIDER OF THE INDICATED PRODUCT OR SERVICE OPERATION 315 includes an unconditional group sale related offer and is made based on an estimated number of the individuals indicating interest in the product or service OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311 accepting the group sale related offer and actually purchasing the product or service.

In one embodiment, the offer data extending a potential group sale related offer of RECEIVE OFFER DATA INDICATING AN OFFER ASSOCIATED WITH THE PRODUCT OR SERVICE FROM AT LEAST ONE PROVIDER OF THE INDICATED PRODUCT OR SERVICE OPERATION 315 includes a conditional group sale related offer and is made conditionally based on a specified/required number of the individuals indicating interest in the product or service of OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311 accepting the group sale related offer and actually purchasing the product or service.

In one embodiment, the offer data extending a potential group sale related offer of RECEIVE OFFER DATA INDICATING AN OFFER ASSOCIATED WITH THE PRODUCT OR SERVICE FROM AT LEAST ONE PROVIDER OF THE INDICATED PRODUCT OR SERVICE OPERATION 315 includes a tier-based group sale related offer, e.g., the group sale related offer terms are dependent on the number of the individuals indicating interest in the product or service of OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311 accepting the group sale related offer and actually purchasing the product or service.

In one embodiment, once the at least one provider of the product or service of ALERT AT LEAST ONE PROVIDER OF THE INDICATED PRODUCT OR SERVICE OF THE INTEREST IN THE PRODUCT OR SERVICE EXCEEDING THE THRESHOLD LEVEL OF INDICATED INTEREST OPERATION 313 is provided the opportunity to provide offer data extending a group sale related offer associated with the product or service to at least one, or all, of the individuals indicating interest in the product or service of OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311 at RECEIVE OFFER DATA INDICATING AN OFFER ASSOCIATED WITH THE PRODUCT OR SERVICE FROM AT LEAST ONE PROVIDER OF THE INDICATED PRODUCT OR SERVICE OPERATION 315, process flow proceeds to PROVIDE AT LEAST PART OF THE OFFER DATA TO AT LEAST ONE OF THE INDIVIDUALS OPERATION 317.

In one embodiment, at PROVIDE AT LEAST PART OF THE OFFER DATA TO AT LEAST ONE OF THE INDIVIDUALS OPERATION 317 the offer data extending a potential group sale related offer of RECEIVE OFFER DATA INDICATING AN OFFER ASSOCIATED WITH THE PRODUCT OR SERVICE FROM AT LEAST ONE PROVIDER OF THE INDICATED PRODUCT OR SERVICE OPERATION 315 is provided to at least one, or all, of the individuals indicating interest in the product or service of OBTAIN ITEM IDENTIFICATION DATA INDICATING A PRODUCT OR SERVICE OF INTEREST TO A FIRST PARTY OPERATION 303 and/or OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311.

In one embodiment, at PROVIDE AT LEAST PART OF THE OFFER DATA TO AT LEAST ONE OF THE INDIVIDUALS OPERATION 317 the offer data extending a potential group sale related offer of RECEIVE OFFER DATA INDICATING AN OFFER ASSOCIATED WITH THE PRODUCT OR SERVICE FROM AT LEAST ONE PROVIDER OF THE INDICATED PRODUCT OR SERVICE OPERATION 315 is provided to at least one, or all, of the individuals indicating interest in the product or service via one or more means/communications channels for data transfer such as, but not limited to, providing data through the one or more network locations; e-mail; text message; POTS; or any other method, means, mechanism, process or procedure for data transfer discussed herein, and/or as known/available in the art at the time of filing, and/or as developed/made available after the time of filing.

In one embodiment, once the offer data extending a potential group sale related offer of RECEIVE OFFER DATA INDICATING AN OFFER ASSOCIATED WITH THE PRODUCT OR SERVICE FROM AT LEAST ONE PRO- VIDER OF THE INDICATED PRODUCT OR SERVICE OPERATION 315 is provided to at least one, or all, of the individuals indicating interest in the product or service of OBTAIN ITEM IDENTIFICATION DATA INDICATING A PRODUCT OR SERVICE OF INTEREST TO A FIRST PARTY OPERATION 303 and/or OBTAIN DATA INDICATING INTEREST IN THE PRODUCT OR SERVICE FROM ONE OR MORE OTHER PARTIES EXCEEDING THE THRESHOLD LEVEL OF INDICATED INTEREST IN THE PRODUCT OR SERVICE OPERATION 311 at PROVIDE AT LEAST PART OF THE OFFER DATA TO AT LEAST ONE OF THE INDIVIDUALS OPERATION 317, process flow proceeds to EXIT OPERATION 330.

In one embodiment, at EXIT OPERATION 330, process 300 for facilitating customer driven group sales and discounts is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process 300 for facilitating customer driven group sales and discounts discussed above, an individual, e.g., a single potential purchaser of a product or service, is provided an effective, efficient, and simple mechanism for identifying and creating group interest in the purchase of the product or service, e.g., for identifying and collecting a group of potential customers of the product or service. Then, using process 300 for facilitating customer driven group sales and discounts, the existence of the group of potential customers of a product or service can easily, efficiently, and effectively be leveraged to solicit/extract a group purchase discount offer from one or more providers of the product or service. Consequently, using process 300 for facilitating customer driven group sales and discounts, individuals can obtain group pricing benefits typically only made available to wholesale and lot purchasers such as wholesale purchasers and retail stores.

In addition, through process 300 for facilitating customer driven group sales and discounts, providers of product and services are provided the opportunity to increase their sales volume, and to essentially utilize individuals as marketing and advertising agents. Consequently, both individual consumers of products and services and providers of the products and services are benefited by the implementation of process 300 for facilitating customer driven group sales and discounts.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "alerting", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "informing", "monitoring", "obtaining", "posting", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for facilitating customer driven group sales and discounts comprising the following, which when executed individually or collectively by any set of one or more processors perform a process including:
   obtaining item identification data indicating a product or service of interest to a first party;
   posting at least part of the item identification data to a network location;
   monitoring, using a module specifically configured for monitoring and collecting data relating to network activity, one or more amounts of time spent at the network location by one or more parties;
   determining respective amounts of time spent by the one or more parties on the network location;
   determining one or more of the respective amounts of time that exceed a predetermined threshold amount of time, resulting in level of interest data;
   responsive to determining one or more of the respective amounts of time exceeding the predetermined threshold amount of time, generating an alert informing at least one provider of the product or service of the level of interest data;
   receiving offer data from the at least one provider of the product or service indicating a group sale related offer associated with the product or service, the offer data reflecting a condition based on a predetermined number of the individuals indicating interest in the product or service accepting the offer and actually purchasing the product or service; and
   providing at least part of the offer data to at least one of the first party or the one or more parties other than the first party.

2. The computing system implemented method for facilitating customer driven group sales and discounts of claim 1 wherein the item identification data is data including an image of the product or service.

3. The computing system implemented method for facilitating customer driven group sales and discounts of claim 1 wherein the item identification data is selected from the group consisting of data including an image of the product or service, data including a URL or link to a webpage associated with the product or service, data including a text description of the product or service, or any combination thereof.

4. The computing system implemented method for facilitating customer driven group sales and discounts of claim 1 wherein the network location is a social media website.

5. The computing system implemented method for facilitating customer driven group sales and discounts of claim 1 wherein the network location is selected from the group consisting of, an Internet website location, a social media website, a blog site, an e-mail-based network location, or any combination thereof.

6. The computing system implemented method for facilitating customer driven group sales and discounts of claim 1 wherein the threshold level of indicated interest includes one or more threshold level of indicated interest conditions selected from the group consisting of:
   the condition that a threshold level of activity associated with the network location is observed;
   the condition that a threshold level of access events associated with the posted item identification data is observed;
   the condition that a threshold level of responses to the posted item identification data indicating expressed interest in purchasing the product or service indicated in the posted item identification data is observed;
   the condition that a threshold number of occurrences of keywords or phrases included in responses to the posted item identification data is detected;
   the condition that a threshold number of access events to the network location of a defined duration occur; or
   or any combination thereof.

7. The computing system implemented method for facilitating customer driven group sales and discounts of claim 1 wherein the offer data indicates a group sale related offer associated with the product or service that is unconditional with respect to the number of the parties that actually purchase the product or service.

8. The computing system implemented method for facilitating customer driven group sales and discounts of claim 1 wherein the offer data indicates a group sale related offer associated with the product or service that is conditional on at least a specified number of the parties actually purchasing the product or service.

9. The computing system implemented method for facilitating customer driven group sales and discounts of claim 1 wherein the offer data indicates a group sale related offer associated with the product or service that includes offer terms that are tiered based on the number of the parties that actually purchase the product or service.

10. A computer program product for facilitating customer driven group sales and discounts comprising:
   a nontransitory computer readable medium;
   and computer program code, encoded on the computer readable medium, comprising computer readable instructions which, when executed via any set of one or more processors, perform the following:
   obtaining item identification data indicating a product or service of interest to a first party;
   posting at least part of the item identification data to a network location;
   monitoring, using a module specifically configured for monitoring and collecting data relating to network activity, one or more amounts of time spent at the network location by one or more parties;
determining respective amounts of time spent by the one or more parties on the network location;
determining one or more of the respective amounts of time that exceed a predetermined threshold amount of time, resulting in level of interest data;
responsive to determining one or more of the respective amounts of time exceeding the predetermined threshold amount of time, generating an alert informing at least one provider of the product or service of the level of interest data;
receiving offer data from the at least one provider of the product or service indicating a group sale related offer associated with the product or service, the offer data reflecting a condition based on a predetermined number of the individuals indicating interest in the product or service accepting the offer and actually purchasing the product or service; and
providing at least part of the offer data to at least one of the first party or the one or more parties other than the first party.

11. The computer program product for facilitating customer driven group sales and discounts of claim 10 wherein the item identification data is data including an image of the product or service.

12. The computer program product for facilitating customer driven group sales and discounts of claim 10 wherein the item identification data is selected from the group consisting of data including an image of the product or service, data including a URL or link to a webpage associated with the product or service, data including a text description of the product or service, or any combination thereof.

13. The computer program product for facilitating customer driven group sales and discounts of claim 10 wherein the network location is a social media website.

14. The computer program product for facilitating customer driven group sales and discounts of claim 10 wherein the network location is selected from the group consisting of, an Internet website location, a social media website, a blog site, an e-mail-based network location, or any combination thereof.

15. The computer program product for facilitating customer driven group sales and discounts of claim 10 wherein the threshold level of indicated interest includes one or more threshold level of indicated interest conditions selected from the group consisting of:
the condition that a threshold level of activity associated with the network location is observed;
the condition that a threshold level of access events associated with the posted item identification data is observed;
the condition that a threshold level of responses to the posted item identification data indicating expressed interest in purchasing the product or service indicated in the posted item identification data is observed;
the condition that a threshold number of occurrences of keywords or phrases included in responses to the posted item identification data is detected;
the condition that a threshold number of access events to the network location of a defined duration occur; or
or any combination thereof.

16. The computer program product for facilitating customer driven group sales and discounts of claim 10 wherein the offer data indicates a group sale related offer associated with the product or service that is unconditional with respect to the number of the parties that actually purchase the product or service.

17. The computer program product for facilitating customer driven group sales and discounts of claim 10 wherein the offer data indicates a group sale related offer associated with the product or service that is conditional on at least a specified number of the parties actually purchasing the product or service.

18. The computer program product for facilitating customer driven group sales and discounts of claim 10 wherein the offer data indicates a group sale related offer associated with the product or service that includes offer terms that are tiered based on the number of the parties that actually purchase the product or service.

19. A system for facilitating customer driven group sales and discounts comprising:
at least one processor; and
at least one memory coupled to the at least one processor, the at least one memory having stored therein instructions which when executed by any set of the one or more processors, perform a process for facilitating customer driven group sales and discounts, the process for facilitating customer driven group sales and discounts including:
obtaining item identification data indicating a product or service of interest to a first party;
posting at least part of the item identification data to a network location;
monitoring, using a module specifically configured for monitoring and collecting data relating to network activity, one or more amounts of time spent at the network location by one or more parties;
determining respective amounts of time spent by the one or more parties on the network location;
determining one or more of the respective amounts of time that exceed a predetermined threshold amount of time, resulting in level of interest data;
responsive to determining one or more of the respective amounts of time exceeding the predetermined threshold amount of time, generating an alert informing at least one provider of the product or service of the level of interest data;
receiving offer data from the at least one provider of the product or service indicating a group sale related offer associated with the product or service, the offer data reflecting a condition based on a predetermined number of the individuals indicating interest in the product or service accepting the offer and actually purchasing the product or service; and
providing at least part of the offer data to at least one of the first party or the one or more parties other than the first party.

20. The system for facilitating customer driven group sales and discounts of claim 19 wherein the item identification data is data including an image of the product or service.

21. The system for facilitating customer driven group sales and discounts of claim 19 wherein the item identification data is selected from the group consisting of data including an image of the product or service, data including a URL or link to a webpage associated with the product or service, data including a text description of the product or service, or any combination thereof.

22. The system for facilitating customer driven group sales and discounts of claim 19 wherein the network location is a social media website.

23. The system for facilitating customer driven group sales and discounts of claim 19 wherein the network location is selected from the group consisting of, an Internet website location, a social media website, a blog site, an e-mail-based network location, or any combination thereof.

24. The system for facilitating customer driven group sales and discounts of claim 19 wherein the threshold level of indicated interest includes one or more threshold level of indicated interest conditions selected from the group consisting of:
- the condition that a threshold level of activity associated with the network location is observed;
- the condition that a threshold level of access events associated with the posted item identification data is observed;
- the condition that a threshold level of responses to the posted item identification data indicating expressed interest in purchasing the product or service indicated in the posted item identification data is observed;
- the condition that a threshold number of occurrences of keywords or phrases included in responses to the posted item identification data is detected;
- the condition that a threshold number of access events to the network location of a defined duration occur; or
- or any combination thereof.

25. The system for facilitating customer driven group sales and discounts of claim 19 wherein the offer data indicates a group sale related offer associated with the product or service that is unconditional with respect to the number of the parties that actually purchase the product or service.

26. The system for facilitating customer driven group sales and discounts of claim 19 wherein the offer data indicates a group sale related offer associated with the product or service that is conditional on at least a specified number of the parties actually purchasing the product or service.

27. The system for facilitating customer driven group sales and discounts of claim 19 wherein the offer data indicates a group sale related offer associated with the product or service that includes offer terms that are tiered based on the number of the parties that actually purchase the product or service.

* * * * *